United States Patent
Guerrero

(10) Patent No.: US 7,591,554 B2
(45) Date of Patent: Sep. 22, 2009

(54) EYEWEAR FRAME ADORNMENT ATTACHING DEVICE

(76) Inventor: Rosaline M. Guerrero, 1301 E. Ibis St., Gilbert, AZ (US) 85297

(*) Notice: Subject to any disclaimer, the term of this patent is extended or adjusted under 35 U.S.C. 154(b) by 0 days.

(21) Appl. No.: 12/060,648

(22) Filed: Apr. 1, 2008

(65) Prior Publication Data
US 2008/0239232 A1 Oct. 2, 2008

Related U.S. Application Data

(60) Provisional application No. 60/909,690, filed on Apr. 2, 2007.

(51) Int. Cl.
*G02C 11/02* (2006.01)
(52) U.S. Cl. .......................... 351/52; 351/51
(58) Field of Classification Search ............ 351/51, 351/52
See application file for complete search history.

(56) References Cited

U.S. PATENT DOCUMENTS

| | | | |
|---|---|---|---|
| 4,968,128 A | 11/1990 | Mendola | |
| 5,110,198 A | 5/1992 | Travis et al. | |
| 5,654,787 A | 8/1997 | Barrison | |
| D425,544 S | 5/2000 | Erpillo | |
| 6,120,146 A * | 9/2000 | Harris | 351/158 |
| 6,520,635 B1 | 2/2003 | Ignatowski | |
| 6,863,394 B1 * | 3/2005 | Nelson et al. | 351/52 |

* cited by examiner

*Primary Examiner*—Huy K Mai

(57) ABSTRACT

A new interchangeable eyewear adornment accessory and attachment method is disclosed. The present invention provides the method of attaching eyewear decorative features so that only the decorative feature is visible, maintains proper orientation, it is held securely in place, it can be easily removed quickly, and it may be easily interchanged with another decoration.

10 Claims, 4 Drawing Sheets

EYEWEAR FRAME ADORNMENT ATTACHING DEVICE

CROSS REFERENCE TO RELATED APPLICATIONS

This application claims the benefit of U.S. Provisional Application No. 60/909,690, filed on Apr. 2, 2007.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This application is directed to the field of eyewear accessories. More specifically, it pertains to decorative enhancements of eyewear frames which are removable and conveniently interchangeable. The decorations are preferably attached to the temples of the eyewear frames, but may be similarly attached in other eyewear frame locations, depending upon the eyewear frame design.

(2) Description of Related Art

Others have attempted to incorporate decorative features in eyewear design. For example, U.S. Pat. No. 6,520,635 utilizes a quick-release spring-biased clamp to attach jewelry to the temples of eyewear. Whereas this attaching method is useful for hanging decorations, this attachment feature does not provide suitable rigidity to properly orient the type of decorations that are suitable for small ornamental designs that are favored for eyewear, such as small 2D or 3D objects such as pop art and similar items. The clamping spring would be visibly exposed when used to clamp a small decorative item, making it very unsuitable and undesirable for the wearer.

U.S. Pat. No. 5,110,198 utilizes decorative eyewear pieces that are attached to the eyewear utilizing pins. The decorations require the eyewear stems are designed to receive the pins, and the decorations can therefore only be attached at particular locations. This highly limits the desirability and practical use of these kinds of decorations.

U.S. Pat. No. 5,654,787 utilizes a retainer to grip the temples of eyewear with an attached strap. The overall design is unsatisfactory for a decorative design as it will not maintain proper orientation due to motion of the attaching strap. The attaching design does not have enough flexibility to accommodate all of the potential temple designs and rigidly maintain decorative orientation. Also, the attaching means is large when compared to the size of smaller decorations and would be exposed to view making it unsuitable and undesirable to a wearer.

It is desirable in the art to miniaturize the means of attaching eyewear decorative features so that only the decorative feature is visible. It is important from an aesthetic viewpoint that only the decoration is visible, the decoration maintains proper orientation, and the decoration does not slide horizontally on the eyewear temple in normal use. Also, it is important that the decoration can be removed quickly and interchanged with another decoration based on the desires of the wearer. Finally, ease of removal and putting in place are important features to include in a design.

BRIEF SUMMARY OF THE INVENTION

The present invention provides the method of attaching eyewear decorative features with consideration so that only the decorative feature is visible, it maintains proper orientation, it is held securely in place, it can be easily removed quickly, and it may be easily interchanged with another decoration.

BRIEF DESCRIPTION OF THE SEVERAL VIEWS OF THE DRAWING(S)

FIGS. 3A-3D demonstrate how the present invention is installed on an eyewear temple.

Figure 4:
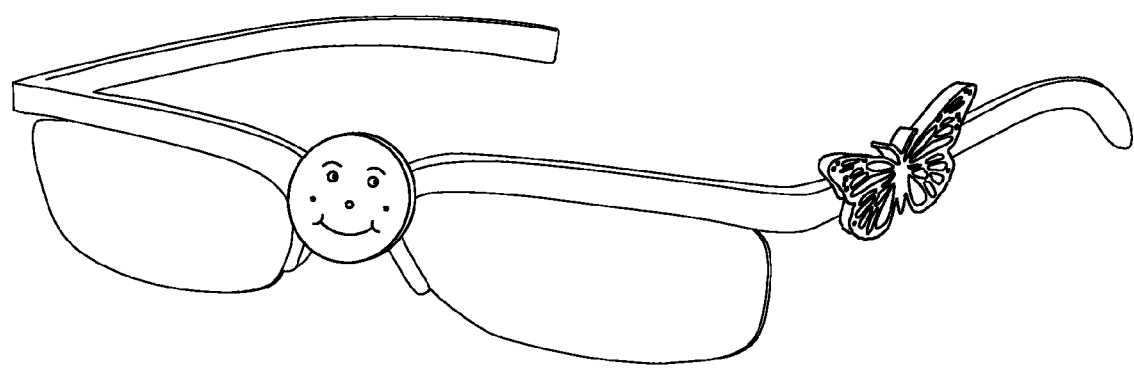

FIG. 4 shows a decorative adornments on eyewear where the attaching feature is not visible.

DETAILED DESCRIPTION OF THE INVENTION

A principal objective of the present invention is to provide an interchangeable eyewear accessory and adornment that will overcome the deficiencies of other art devices. Another important objective is to allow a user to customize their eyewear frame with a variety of interchangeable adornment charms or decorations. It is highly desirable to provide decorative features that do not impede vision, remain in a stationary position during user motion, and fit a variety of different eyewear frames.

It is highly desirable to provide for a wide variety of different adornments to be mounted on eyewear frames, and especially eyewear temples, by a mounting system method that provides for the features just described. The adornments may include a large variety of 2D or 3D items such as butterflies, birds, animals, pop art, pictures, flowers, bugs, words, cars, jewels, coins, stars, logos, sports items, entertainment items, promotional items, and similar items as may be desirable for a user to wear.

Figure 1:
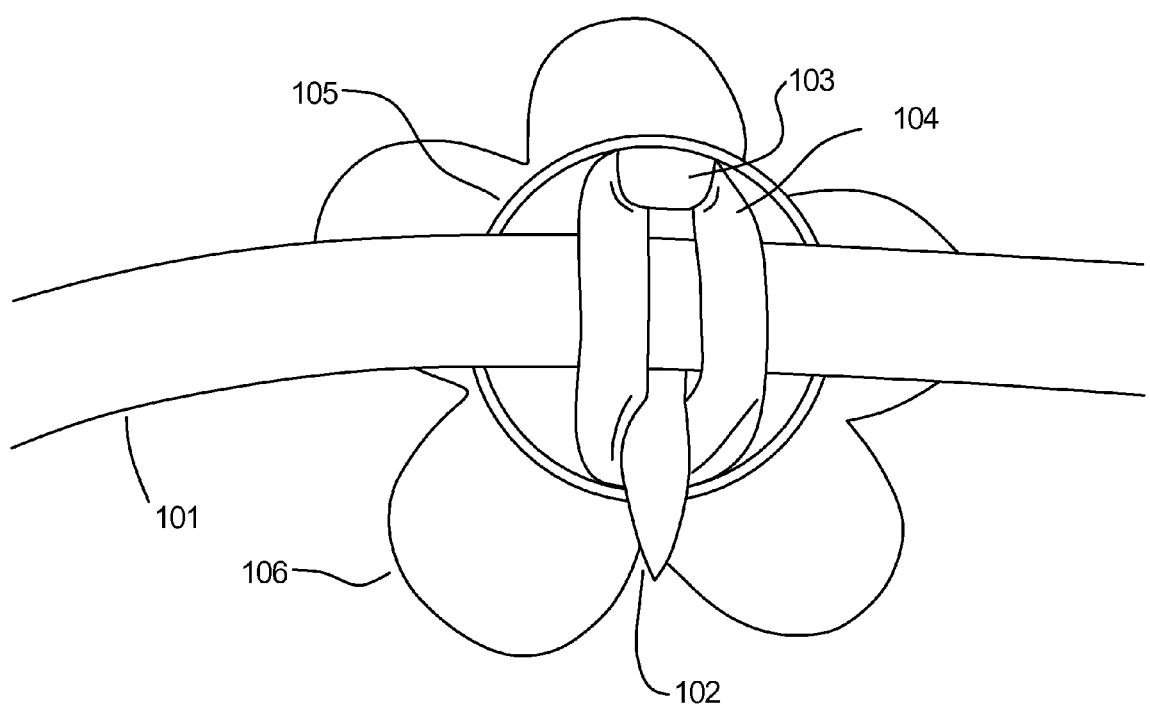
FIG. 1 shows the attaching feature of the present invention on the temples.

FIG. 1 shows the attaching feature of the present invention on an eyewear temple or stem. An eyewear temple 101 is viewed from the inside where the head of the wearer would be located. The back of an adornment 106 is also shown. A mounting button 105 is attached by an adhesive (not shown) to the back of the adornment 106. A circular elastic band 104 loops inside an upper attachment 103 and a lower hook 102 which encircles the eyewear temple 101. The upper attachment 103 is rigidly connected to the mounting button 105. The elastic band is stretched tight enough so that the mounting button 105 is held firmly against the eyewear temple with enough pressure so that the mounting button 105 will not rotate under normal user activity.

The mounting button shown in FIG. 1 is in the form of a round shallow cup. Other cup shapes may also be used and include, but are not limited to, square, rectangle, oval, diamond, octagon, hexagon, triangle, rhombus, semicircle, pentagon, trapezoid, and ellipse.

In a preferred embodiment, the upper attachment is a crimped or looping structure that encircles the elastic band. It preferably captures the elastic band in a permanent manner, that is, in a way that keeps the elastic band from being removable by the user without the use of a tool or significant finger pressure. In an alternative embodiment, the upper attachment merely hooks the elastic band in a way that reasonably prevents the elastic band from becoming loose under normal use. The present invention provides important convenience by ensuring that the elastic band is not easily lost or springs away when installing the adornment.

The upper attachment is preferably located substantially on the edge of the mounting button cup. This should be taken to mean that it is located near by or touching the inside edge-wall, located on the edge itself, or located on the outside edge-wall. The upper attachment may be designed as an integral part of the mounting button or it may be a separate attachment that is added onto it. It is preferably made of the same material as the mounting button, but this is not a requirement.

The mounting button is a small flat cup structure and could be made up of many materials. It is preferably made of copper, brass, tinplate, aluminum, stainless steel, or plastic. The flat portion of the cup presents a relatively large surface area that is easily attached to the adornment.

In a preferred embodiment the lower hook structure is elongated, is flat, and lays within the mounting cup to provide an additional stationary support for the eyewear temple to allow for mounting stability. When the elastic band presses the mounting button against the eyewear temple, it also presses the eyewear temple against the elongated portion of the lower hook. In general, the hook structure merely protrudes from the mounting cup in a way to catch the elastic band and hold it in tension from the upper attachment. Various hook projections could be used, and the illustration in FIG. 1 is only one embodiment of the present invention.

Preferably the lower hooking structure or feature is located substantially on the edge of the mounting button. This should be taken to mean that it is located near by or on the inside edge-wall, on the edge itself, or on the outside edge-wall. Additionally, it is preferably located opposite to the upper attachment structure, that is, positioned on the opposite side of the mounting button so that the elastic band will have a large span capability. The hooking structure may be designed as an integral part of the mounting button or it may be a separate attachment that is added onto it. It is preferably made of the same material as the mounting button, but this is not a requirement.

Figure 2:
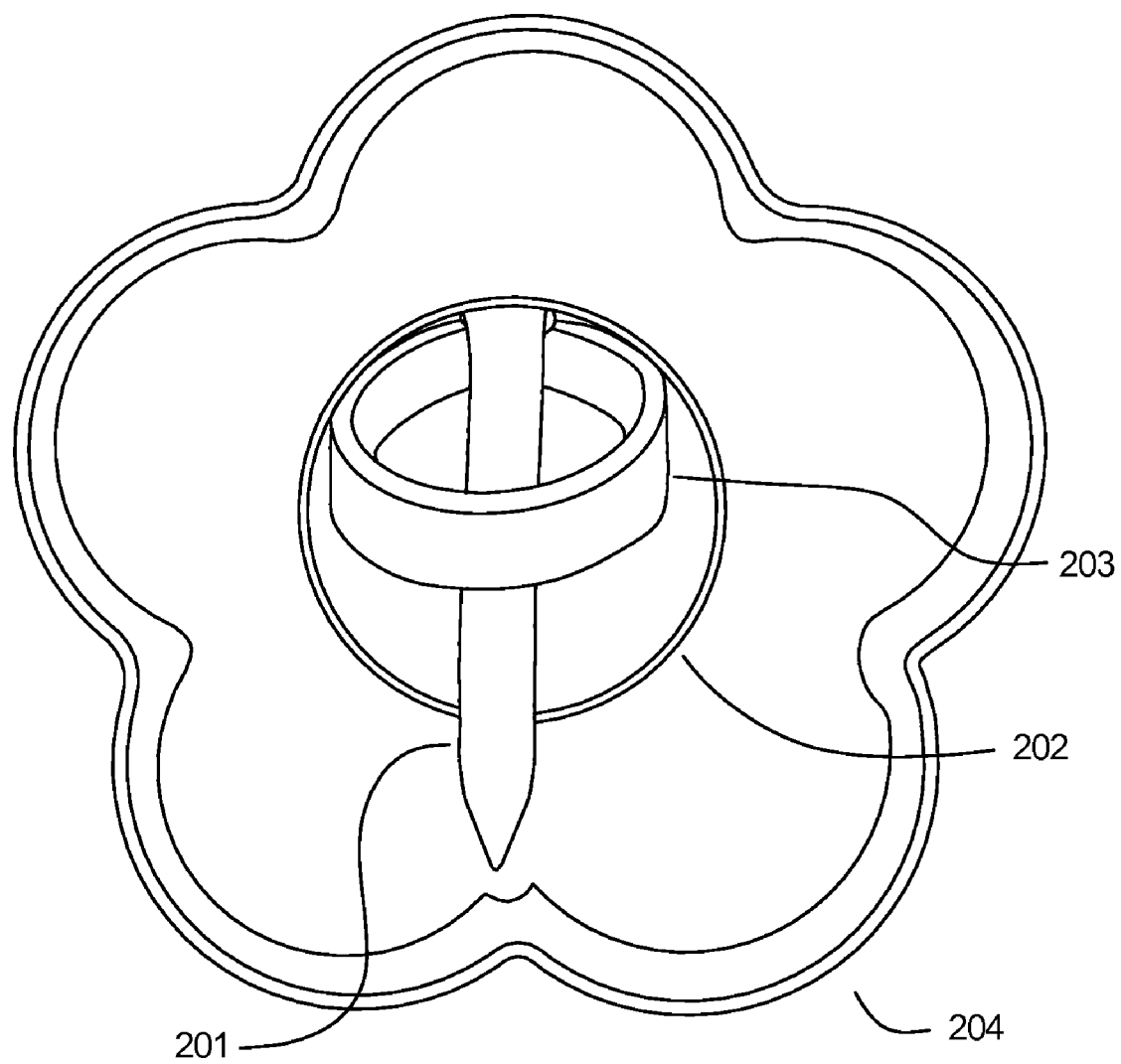
FIG. 2 shows the back of a decorative feature where the attaching means is more clearly visible.

FIG. 2 is a view similar to FIG. 1, but without the eyewear temple. FIG. 2 shows the hook 201, the mounting button 202, the elastic band 203, and the decorative adornment 204 without an eyewear temple. The elastic band in this view is not stretched. In this case, the hook 201 is connected to the mounting button at approximately where the elastic band is connected. However, the hook may also be connected anywhere along its length. In another preferred embodiment, the hook is connected to the mounting button on the edge opposite to the upper attachment structure for the elastic band.

The elastic band is preferably made of a non latex material. It is preferably made out of an elastomer material with suitable elongation properties that allow it to suitably stretch without significant loss of flexibility. In a preferred embodiment, the elastic band is 3/16" in diameter, medium 3.5 ounces, type UNL743 as made by Glenroe Technologies of Bradenton, Fla. The diameter may be measured by the inside or outside diameter. This type of elastic band is very small and has a well established force curve based on the stretched diameter. Stretch forces approximate 0.33 Lbf (150 grams) per inch of stretch. A practical amount of stretch force would be 0.28 to 0.42 Lbf (125 to 190 grams) per inch. The elastic band is capable of being stretched well over six times the original length.

Other elastic bands may be employed with equal success which develop different forces depending upon the thickness of the elastic band. In alternate embodiments, other elastomer materials could also be used with equal success which provide suitable elastic and tension properties.

The mounting button is preferably of a small diameter, less than the size of the adornment. Suitable diameters are 7 to 18 mm. A typical button thickness would be about 1 to 1.5 mm, but this value is not critical. It is better if the button diameter is larger than the eyeglass temple width so that the upper attachment will not be located between the temple and the mounting button. This prevents the elastic band from separating the mounting button from the temple. However, the elastic band will typically create enough pressure to rigidly hold the adornment in place, so this is not a requirement.

In another embodiment, the single elastic band shown in FIGS. 1 and 2 may be replaced by multiple elastic bands which may be held in place by one or more lower hooks.

In a preferred embodiment, the attachment between the adornment and the mounting button is by known methods. The most preferable method is by adhesive attachment which may be by epoxy, craft glue, hot glue, various permanent glues, and other adhesive methods of attachment not specifically referred to herein. In other embodiments of the present invention, other attachment methods may be employed which include brazing, welding, riveting, and crimping. Attachment methods may also include the bending of metal.

It is intended that the user may easily unhook the elastic band from the lower hook and thereby detach the adornment from the frame. In a preferred embodiment, the user is able to do this with fingers. Alternately, a small tool may be employed.

Figure 3A:
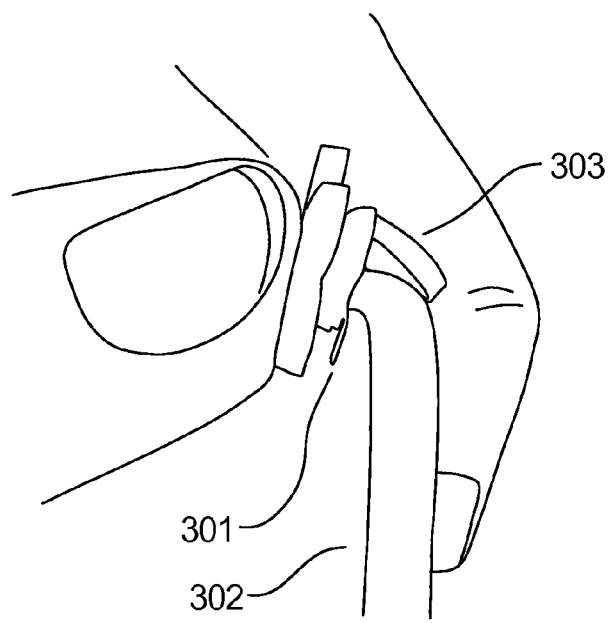
Figure 3B:
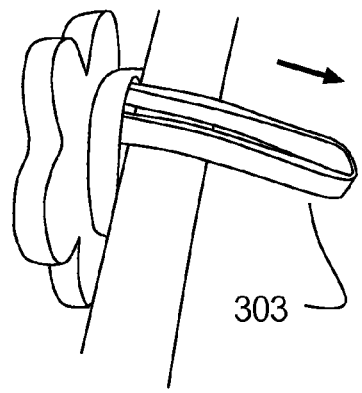
Figure 3C:
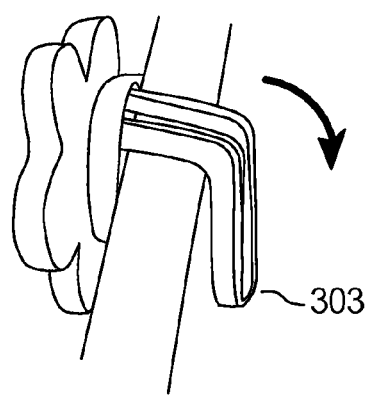
Figure 3D:
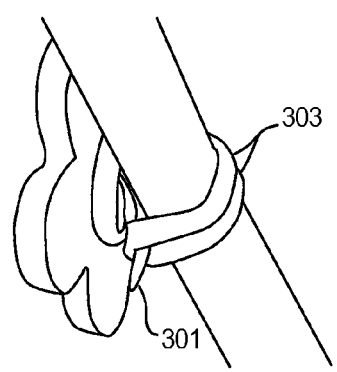

FIGS. 3A-3D show how the adornment is attached to an eyewear stem or temple. The decorative adornment is held in place by thumb pressure against the eyewear temple 302 with the elastic band 303 above and the hook 301 below the eyewear temple 302. FIG. 3B shows the elastic band 303 being stretched and FIG. 3C shows that it is being looped under the eyewear temple. FIG. 3D shows the band as finally hooked and the installation complete. Thumb pressure continues to be applied in FIGS. 3B and 3C. The elastic band can be stretched and hooked by finger pressure or by use of a suitable tool.

FIG. 4 shows eyewear frames that have two decorative adornments in place. One is over the nose bridge and one is on a side temple. Note that the attaching hardware, including the elastic bands, is not visible from the view shown. This is due to the reduced size of the attaching hardware (mounting button, elastic band, etc.) relative to the size of the decorative adornment.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A temporary eyewear frame adornment comprising:
   a. a mounting member in the shape of a shallow cup,
   b. wherein said mounting member includes a first attachment structure located substantially on the edge of said mounting member,
   c. wherein said mounting member includes a hooking feature which is located substantially on the edge of said mounting member at a position substantially opposite to said first attachment structure, d. at least one elastic band, wherein said at least one elastic band is attached to said first attachment structure,
e. an adornment which is attached to the outer flat portion of said mounting member, and
f. wherein said at least one elastic band is used to temporarily attach said adornment to an eyewear frame by use of said hooking feature.

2. The temporary eyewear frame adornment according to claim 1 wherein said adornment is attached to said mounting member by use of an adhesive, wherein said adhesive includes epoxy, craft glue, and hot glue.

3. The temporary eyewear frame adornment according to claim 1 wherein said mounting member is a round circular shallow cup, and said round circular shallow cup diameter is between 7 to 18 mm inclusive, and said round circular shallow cup depth is less than or equal to 1.5 mm.

4. The temporary eyewear frame adornment according to claim 1 wherein said shallow cup is a simple polygon cup with at least three sides, and the maximum outside span of said simple polygon cup is between 7 to 18 mm inclusive, and said simple polygon cup depth is less than or equal to 1.5 mm.

5. The temporary eyewear frame adornment according to claim 1 wherein the shape of said shallow cup is selected from the group consisting of: square, rectangle, oval, diamond, octagon, hexagon, triangle, rhombus, semicircle, pentagon, trapezoid, and ellipse.

6. The temporary eyewear frame adornment according to claim 1 wherein each of said at least one elastic band develops between 0.28 and 0.42 pounds of force inclusive per linear inch of stretch.

7. The temporary eyewear frame adornment according to claim 1 wherein said hooking feature is elongated and projects into the cup portion of said mounting member.

8. The temporary eyewear frame adornment according to claim 7 wherein said hooking feature has the following additional properties when said at least one elastic band is stretched and engaged with said hooking feature:
    a. said hooking feature is pressed against said eyewear frame, and
    b. said hooking feature provides additional stability to prevent rotation of said adornment.

9. The temporary eyewear frame adornment according to claim 1 wherein said at least one elastic band is permanently attached to said first attachment structure.

10. The temporary eyewear frame adornment according to claim 1 wherein said at least one elastic band is substantially 3/16 inches in diameter as measured by the inside or outside diameter when formed into a round unstrained shape.

* * * * *